United States Patent
Vickery

(10) Patent No.: US 8,720,107 B1
(45) Date of Patent: May 13, 2014

(54) TAMPER-RESISTANT FLY CONTROL STATION AND METHODS FOR USING THE SAME

(75) Inventor: Ethan Vickery, Mansfield, TX (US)

(73) Assignee: VM Products Inc., Colleyville, TX (US)

( * ) Notice: Subject to any disclaimer, the term of this patent is extended or adjusted under 35 U.S.C. 154(b) by 589 days.

(21) Appl. No.: 11/786,355

(22) Filed: Apr. 11, 2007

Related U.S. Application Data

(60) Provisional application No. 60/791,294, filed on Apr. 11, 2006.

(51) Int. Cl.
  *A01M 1/20* (2006.01)
  *A01M 1/10* (2006.01)

(52) U.S. Cl.
  USPC .................................. 43/131; 43/122; 43/107

(58) Field of Classification Search
  USPC .......... 43/131, 122, 121, 107; 239/34, 37, 39, 239/41, 42, 57–59
  See application file for complete search history.

(56) References Cited

U.S. PATENT DOCUMENTS

| | | | |
|---|---|---|---|
| 524,894 A | 8/1894 | Forsberg | |
| 759,030 A | 5/1904 | Sheaffer | 43/131 |
| 794,323 A * | 7/1905 | Small | 43/131 |
| RE14,782 E | 12/1919 | Hedrich et al. | 43/131 |
| 1,443,287 A | 1/1923 | Snyder et al. | 43/131 |
| 1,729,389 A | 9/1929 | Hughett | 43/131 |
| 1,744,022 A * | 1/1930 | Davis | 43/131 |
| 1,831,654 A * | 11/1931 | Cross | 239/57 |
| 1,885,201 A * | 11/1932 | Holley | 222/181.2 |
| 2,201,784 A * | 5/1940 | Myers | 239/41 |
| 2,242,099 A * | 5/1941 | Wittwer et al. | 43/131 |
| 2,451,578 A * | 10/1948 | Rosefield | 43/131 |
| 2,456,324 A * | 12/1948 | Roessner | 43/131 |
| 2,480,724 A * | 8/1949 | Feussner | 43/131 |
| 2,532,681 A * | 12/1950 | Stover | 43/131 |
| 2,556,608 A * | 6/1951 | Will | 239/47 |
| 2,568,168 A * | 9/1951 | Query | 43/131 |
| 2,569,833 A | 10/1951 | Simpson | 43/100 |
| 2,608,022 A * | 8/1952 | Wright | 43/112 |
| 2,608,396 A * | 8/1952 | Shapiro | 239/43 |
| 2,734,769 A * | 2/1956 | Holz | 239/57 |

(Continued)

FOREIGN PATENT DOCUMENTS

| | | | | |
|---|---|---|---|---|
| EP | 442190 A1 * | 8/1991 | | A01M 25/00 |
| EP | 1057958 A2 * | 12/2000 | | A01M 25/00 |

(Continued)

OTHER PUBLICATIONS

"Protecta Mouse Bait Station Features," RTU Mouse Bait Stations, http://www.rodentcontrols.com/mouse-bait-stations-rtu.htm, published Jun. 2004.

(Continued)

*Primary Examiner* — Darren W Ark
(74) *Attorney, Agent, or Firm* — Fulbright & Jaworski LLP

(57) ABSTRACT

A station for holding an insect control product includes a body portion having sidewalls and a rear wall defining a receptacle having an opening. A door portion is rotatably coupled to the body portion for covering the opening defined by the body portion in a closed configuration of the station. A tamper resistant latching mechanism is disposed within the receptacle in the closed configuration of the station, and is accessible by a key through an aperture through the door portion.

16 Claims, 2 Drawing Sheets

(56) References Cited

U.S. PATENT DOCUMENTS

| | | | | |
|---|---|---|---|---|
| 2,736,127 A | | 2/1956 | McCann | 43/131 |
| 2,750,707 A | | 6/1956 | Ekstedt | 43/131 |
| 2,784,577 A | | 3/1957 | Beaham | 248/146 |
| 2,825,996 A | * | 3/1958 | Grant | 43/131 |
| 2,837,861 A | | 6/1958 | Graham | 43/131 |
| 2,893,160 A | * | 7/1959 | Grant | 43/131 |
| 2,896,361 A | | 7/1959 | Allen | 43/131 |
| 2,942,786 A | * | 6/1960 | Russo et al. | 221/44 |
| 2,950,562 A | | 8/1960 | Lothrop | 43/102 |
| 2,953,868 A | | 9/1960 | Chambers | 43/131 |
| 3,017,717 A | * | 1/1962 | Caubre | 43/131 |
| 3,108,391 A | * | 10/1963 | Sipos | 43/131 |
| 3,125,407 A | * | 3/1964 | Kagan | 239/57 |
| 3,271,894 A | | 9/1966 | Manno et al. | 43/65 |
| 3,303,600 A | | 2/1967 | Freeman | 43/131 |
| 3,318,039 A | | 5/1967 | MacDonald et al. | 43/100 |
| 3,319,373 A | | 5/1967 | Gale et al. | 43/100 |
| 3,343,744 A | | 9/1967 | Morell et al. | 229/149 |
| 3,427,743 A | | 2/1969 | Brunner et al. | 43/131 |
| 3,471,114 A | | 10/1969 | Ball | 248/346.03 |
| 3,488,879 A | | 1/1970 | Laughlin | 43/131 |
| 3,540,630 A | * | 11/1970 | Brown et al. | 222/181.2 |
| 3,575,346 A | | 4/1971 | Roth et al. | 43/131 |
| 3,704,539 A | | 12/1972 | Alvarez | 43/131 |
| 3,708,905 A | | 1/1973 | Jalbert | 43/100 |
| 3,738,621 A | * | 6/1973 | Anderson | 261/29 |
| D227,563 S | | 7/1973 | Torchia | D22/19 |
| 3,821,861 A | | 7/1974 | Jalbert | 43/65 |
| 3,826,036 A | * | 7/1974 | Neugebauer | 43/131 |
| 3,828,464 A | * | 8/1974 | Peace | 43/131 |
| 3,978,607 A | | 9/1976 | Piere | 43/131 |
| 3,992,804 A | | 11/1976 | Senese | 43/100 |
| 3,995,595 A | * | 12/1976 | Williams | 43/131 |
| 4,065,872 A | * | 1/1978 | Patton et al. | 43/131 |
| 4,166,087 A | * | 8/1979 | Cline et al. | 261/30 |
| 4,182,070 A | | 1/1980 | Connelly | 43/131 |
| 4,194,690 A | * | 3/1980 | Stever et al. | 43/131 |
| 4,208,828 A | * | 6/1980 | Hall et al. | 43/121 |
| 4,208,829 A | * | 6/1980 | Manning | 43/131 |
| 4,226,042 A | | 10/1980 | Gilbert | 43/96 |
| 4,228,613 A | * | 10/1980 | Kalnasy et al. | 43/131 |
| 4,277,907 A | | 7/1981 | Ernest | 43/131 |
| 4,294,778 A | * | 10/1981 | DeLuca | 261/30 |
| 4,301,095 A | * | 11/1981 | Mettler et al. | 239/57 |
| 4,395,842 A | * | 8/1983 | Margulies | 43/131 |
| 4,396,557 A | * | 8/1983 | DeLuca | 261/30 |
| 4,398,643 A | | 8/1983 | Conlon | 248/500 |
| 4,400,904 A | * | 8/1983 | Baker | 43/131 |
| 4,407,427 A | | 10/1983 | Reuter | 220/339 |
| D271,231 S | | 11/1983 | Stout | D22/122 |
| 4,418,493 A | | 12/1983 | Jordan | 43/67 |
| 4,438,606 A | | 3/1984 | Chardon et al. | 52/79.1 |
| 4,452,500 A | * | 6/1984 | Zlotnik | 261/DIG. 88 |
| 4,453,337 A | * | 6/1984 | Williams | 43/131 |
| 4,485,582 A | | 12/1984 | Morris | 43/131 |
| 4,486,973 A | | 12/1984 | Faucillon | 43/100 |
| 4,505,065 A | * | 3/1985 | Niemeyer | 43/122 |
| 4,521,987 A | * | 6/1985 | Knote | 43/131 |
| 4,541,198 A | | 9/1985 | Sherman | 43/131 |
| D281,231 S | | 11/1985 | Cochran | D9/456 |
| 4,550,525 A | * | 11/1985 | Baker et al. | 43/131 |
| 4,570,377 A | | 2/1986 | Primavera | 43/131 |
| 4,619,071 A | * | 10/1986 | Willis | 43/131 |
| 4,621,749 A | * | 11/1986 | Kanfer | 222/181.2 |
| 4,637,162 A | * | 1/1987 | Sherman | 43/131 |
| 4,648,201 A | * | 3/1987 | Sherman | 43/131 |
| 4,660,320 A | | 4/1987 | Baker et al. | 43/131 |
| 4,730,411 A | | 3/1988 | Katis | 43/105 |
| 4,730,412 A | * | 3/1988 | Sherman | 43/131 |
| 4,743,406 A | * | 5/1988 | Steiner et al. | 239/57 |
| 4,753,032 A | | 6/1988 | Sherman | 43/131 |
| 4,765,579 A | | 8/1988 | Robbins, III et al. | 248/101 |
| 4,815,231 A | * | 3/1989 | McQueen | 43/121 |
| 4,825,581 A | * | 5/1989 | Dailey | 43/131 |
| 4,830,791 A | * | 5/1989 | Muderlak et al. | 239/57 |
| 4,831,775 A | * | 5/1989 | Sherman | 43/131 |
| 4,833,819 A | * | 5/1989 | Sherman | 43/131 |
| 4,835,902 A | * | 6/1989 | Sherman | 43/131 |
| 4,840,770 A | * | 6/1989 | Walz et al. | 239/60 |
| 4,857,240 A | * | 8/1989 | Kearnes et al. | 239/60 |
| 4,865,816 A | * | 9/1989 | Walz et al. | 239/60 |
| 4,866,877 A | * | 9/1989 | Barak | 43/121 |
| 4,870,780 A | | 10/1989 | Sherman | 43/131 |
| 4,872,582 A | | 10/1989 | Sipple | 220/1 T |
| 4,874,103 A | | 10/1989 | Quisenberry et al. | 220/1 T |
| 4,905,407 A | | 3/1990 | Sherman | 43/131 |
| 4,931,258 A | * | 6/1990 | Zlotnik et al. | 239/57 |
| 4,938,144 A | * | 7/1990 | Demarest | 43/125 |
| 5,004,114 A | | 4/1991 | Terbrusch et al. | 220/1 |
| 5,014,943 A | | 5/1991 | Nelson et al. | 248/99 |
| 5,038,516 A | * | 8/1991 | Doucette | 43/131 |
| 5,040,327 A | * | 8/1991 | Stack et al. | 43/131 |
| 5,042,194 A | * | 8/1991 | Cohen | 43/131 |
| 5,105,972 A | | 4/1992 | Waterston et al. | 220/603 |
| 5,105,990 A | * | 4/1992 | Leith | 222/181.2 |
| 5,126,078 A | * | 6/1992 | Steiner et al. | 261/26 |
| 5,131,184 A | | 7/1992 | Harrison | 43/100 |
| 5,136,803 A | * | 8/1992 | Sykes et al. | 43/131 |
| 5,150,810 A | | 9/1992 | Loebbert | 220/404 |
| 5,152,420 A | | 10/1992 | Bird et al. | 220/600 |
| 5,174,462 A | | 12/1992 | Hames | 220/87.1 |
| 5,183,182 A | * | 2/1993 | Comstock et al. | 222/181.2 |
| 5,184,836 A | | 2/1993 | Andrews, Jr. et al. | 280/79.5 |
| 5,223,182 A | * | 6/1993 | Steiner et al. | 261/26 |
| 5,237,774 A | * | 8/1993 | Warner | 43/131 |
| 5,271,560 A | * | 12/1993 | De Winter | 222/181.2 |
| 5,272,832 A | * | 12/1993 | Marshall et al. | 43/131 |
| 5,295,607 A | | 3/1994 | Chang | 220/407 |
| 5,368,200 A | * | 11/1994 | De Winter | 222/153.09 |
| D354,690 S | | 1/1995 | Butler et al. | D10/46 |
| 5,379,545 A | | 1/1995 | Gall | 43/124 |
| 5,385,258 A | | 1/1995 | Sutherlin | 220/334 |
| 5,405,041 A | | 4/1995 | Van Brackle | 220/407 |
| 5,413,251 A | * | 5/1995 | Adamson | 222/181.2 |
| 5,419,453 A | | 5/1995 | Lochridge | 220/404 |
| 5,448,852 A | * | 9/1995 | Spragins et al. | 43/131 |
| 5,452,825 A | * | 9/1995 | Comstock et al. | 222/181.2 |
| 5,458,259 A | | 10/1995 | Falk | 221/22 |
| 5,503,292 A | | 4/1996 | Cuccharia | 220/407 |
| 5,513,465 A | | 5/1996 | Demarest et al. | 43/113 |
| 5,517,783 A | * | 5/1996 | Edgar | 43/54.1 |
| 5,549,214 A | | 8/1996 | Harris | 220/339 |
| D374,704 S | | 10/1996 | Rimback | D22/122 |
| 5,628,143 A | * | 5/1997 | Doucette | 43/131 |
| 5,713,153 A | * | 2/1998 | Cook et al. | 43/121 |
| 5,713,492 A | * | 2/1998 | DeGennaro | 222/185.1 |
| 5,791,525 A | * | 8/1998 | Fan | 222/181.3 |
| 5,806,237 A | * | 9/1998 | Nelson et al. | 43/131 |
| 5,839,220 A | | 11/1998 | Wass | 43/105 |
| 5,848,692 A | | 12/1998 | Thorne et al. | 206/366 |
| 5,873,193 A | | 2/1999 | Jensen | 43/131 |
| 5,897,018 A | | 4/1999 | Pruitt | 220/603 |
| 5,937,571 A | * | 8/1999 | Megargle et al. | 43/131 |
| 5,943,814 A | | 8/1999 | Bartlett, Jr. | 43/104 |
| 5,966,863 A | * | 10/1999 | Payton et al. | 43/131 |
| 5,987,811 A | | 11/1999 | Wiesener et al. | 43/131 |
| 6,014,834 A | * | 1/2000 | Ferland | 43/131 |
| 6,041,542 A | * | 3/2000 | Payton et al. | 43/131 |
| 6,058,646 A | | 5/2000 | Bisoff et al. | 43/131 |
| 6,082,042 A | * | 7/2000 | Issitt | 43/131 |
| 6,082,586 A | * | 7/2000 | Banks | 222/181.3 |
| 6,131,773 A | * | 10/2000 | Wade et al. | 222/181.3 |
| 6,155,002 A | | 12/2000 | Holder | 43/115 |
| 6,158,166 A | | 12/2000 | Snell et al. | 43/131 |
| 6,219,960 B1 | | 4/2001 | Contadini et al. | 43/121 |
| 6,234,339 B1 | | 5/2001 | Thomas | 220/495.07 |
| 6,244,518 B1 | * | 6/2001 | Pogue | 239/57 |
| 6,247,592 B1 | | 6/2001 | Racicot et al. | 206/366 |
| 6,267,079 B1 | | 7/2001 | Eby | 119/226 |
| 6,305,122 B1 | * | 10/2001 | Iwao et al. | 43/112 |
| 6,325,245 B1 | * | 12/2001 | Matthews | 222/181.1 |
| 6,370,813 B1 | * | 4/2002 | Nelson et al. | 43/131 |
| 6,378,243 B1 | | 4/2002 | Snell et al. | 43/131 |
| 6,397,517 B1 | * | 6/2002 | Leyerle et al. | 43/131 |

(56) References Cited

U.S. PATENT DOCUMENTS

| | | | |
|---|---|---|---|
| 6,401,384 B1 | 6/2002 | Contadini et al. | 43/132.1 |
| 6,446,930 B1 | 9/2002 | Li | 248/519 |
| 6,470,622 B1 | 10/2002 | Braun | 43/131 |
| 6,474,015 B1 * | 11/2002 | Lund et al. | 43/131 |
| 6,474,016 B2 | 11/2002 | Snell et al. | 43/131 |
| 6,493,988 B1 * | 12/2002 | Johnson | 43/131 |
| 6,508,377 B1 | 1/2003 | Griswold et al. | 220/495.06 |
| 6,511,033 B2 | 1/2003 | Li | 248/519 |
| 6,513,283 B1 | 2/2003 | Crossen | 43/131 |
| 6,530,172 B2 * | 3/2003 | Lenz | 43/112 |
| 6,571,509 B2 * | 6/2003 | Frasier | 43/131 |
| 6,618,983 B1 | 9/2003 | Spragins | 43/107 |
| 6,619,509 B2 * | 9/2003 | DeKoning et al. | 222/183 |
| 6,637,717 B2 | 10/2003 | Li | 248/519 |
| 6,644,493 B1 | 11/2003 | Walton et al. | 220/603 |
| 6,651,378 B2 * | 11/2003 | Baker | 43/131 |
| 6,671,999 B1 * | 1/2004 | Doucette | 43/131 |
| 6,672,000 B2 | 1/2004 | Aesch, Jr. | 43/132.1 |
| D486,203 S | 2/2004 | Stephen | D22/122 |
| 6,718,687 B2 | 4/2004 | Robison | 43/114 |
| 6,722,080 B2 | 4/2004 | Carter | 43/107 |
| 6,729,067 B2 * | 5/2004 | Lund et al. | 43/131 |
| 6,729,503 B2 * | 5/2004 | DeKoning et al. | 222/183 |
| 6,786,349 B2 | 9/2004 | Najd | 220/484 |
| 6,789,351 B2 | 9/2004 | Chrestman | 43/122 |
| 6,792,713 B2 | 9/2004 | Snell | 43/124 |
| 6,807,768 B2 | 10/2004 | Johnson et al. | 43/131 |
| D498,286 S | 11/2004 | Loerakker et al. | D22/122 |
| 6,860,062 B2 | 3/2005 | Spragins | 43/121 |
| 6,869,058 B2 | 3/2005 | Tung | 248/346.01 |
| 6,874,273 B1 * | 4/2005 | Weisenburg, III | 43/112 |
| 6,874,274 B2 * | 4/2005 | Townsend | 43/131 |
| 6,901,694 B1 | 6/2005 | Neault et al. | 43/131 |
| 6,910,300 B1 | 6/2005 | Warren | 43/131 |
| 6,981,680 B1 | 1/2006 | Gordon et al. | 248/346.01 |
| 7,028,861 B2 * | 4/2006 | Sayers et al. | 222/181.3 |
| 7,073,287 B2 | 7/2006 | Lau | 43/107 |
| 7,089,702 B2 * | 8/2006 | McAllister | 43/131 |
| 7,165,354 B1 | 1/2007 | Rickenbacker | 43/131 |
| 7,213,869 B1 | 5/2007 | McClellan | 296/163 |
| 7,377,072 B2 * | 5/2008 | Meier et al. | 43/131 |
| 7,458,183 B2 * | 12/2008 | Meier et al. | 43/122 |
| 7,513,476 B1 | 4/2009 | Huang | 248/469 |
| 7,611,030 B2 * | 11/2009 | Reynolds et al. | 222/181.3 |
| 7,798,422 B2 * | 9/2010 | Trevino | 239/57 |
| 2002/0043018 A1 | 4/2002 | Townsend | 43/131 |
| 2002/0069579 A1 * | 6/2002 | Hyatt et al. | 43/131 |
| 2003/0038141 A1 | 2/2003 | Landsberger | 220/603 |
| 2003/0116569 A1 | 6/2003 | Mercier | 206/438 |
| 2004/0195250 A1 | 10/2004 | Fripps | 220/603 |
| 2005/0028431 A1 * | 2/2005 | Hoyes et al. | 43/131 |
| 2005/0097808 A1 | 5/2005 | Vorhies et al. | 43/61 |
| 2005/0102887 A1 * | 5/2005 | Lang et al. | 43/64 |
| 2005/0132637 A1 | 6/2005 | Deakins | 43/131 |
| 2007/0068068 A1 * | 3/2007 | Weiss et al. | 43/132.1 |
| 2007/0124987 A1 * | 6/2007 | Brown et al. | 43/113 |
| 2008/0035675 A1 * | 2/2008 | Norman | 222/181.3 |
| 2008/0072475 A1 * | 3/2008 | Nelson et al. | 43/131 |
| 2008/0163541 A1 * | 7/2008 | Harris | 43/131 |
| 2008/0302000 A1 * | 12/2008 | Kidder | 43/131 |
| 2009/0139133 A1 * | 6/2009 | Harper | 43/131 |
| 2009/0229170 A1 * | 9/2009 | Gaibotti | 43/131 |
| 2009/0288333 A1 * | 11/2009 | Johnston et al. | 43/131 |
| 2010/0325940 A1 * | 12/2010 | Pryor et al. | 43/131 |
| 2013/0318862 A1 * | 12/2013 | Lawrence et al. | 43/131 |

FOREIGN PATENT DOCUMENTS

| | | | | |
|---|---|---|---|---|
| FR | 2 268 464 A | | 12/1975 | |
| FR | 2 331 281 A | | 7/1977 | |
| FR | 2 398 454 A | | 3/1979 | |
| GB | 2139468 A | * | 11/1984 | A01M 1/20 |
| GB | 2 249 249 A | | 5/1992 | |
| GB | 2 269 306 A | | 2/1994 | |
| GB | 2382515 A | * | 6/2003 | A01M 25/00 |
| GB | 2 384 966 A | | 8/2003 | |
| GB | 2384966 A | * | 8/2003 | A01M 25/00 |
| GB | 2 398 454 A | | 8/2004 | |
| JP | 06245679 A | * | 9/1994 | A01M 1/20 |
| JP | 07274795 A | * | 10/1995 | A01M 1/20 |
| JP | 09313083 A | * | 12/1997 | A01M 1/20 |
| JP | 2002320437 A | * | 11/2002 | A01M 1/20 |
| JP | 2002330686 A | * | 11/2002 | A01M 1/20 |
| JP | 2003125691 A | * | 5/2003 | A01M 1/20 |
| WO | WO 9903340 A1 | * | 1/1999 | A01M 25/00 |
| WO | WO 02/13604 | | 2/2002 | |
| WO | WO02102147 A1 | * | 12/2002 | A01M 25/00 |
| WO | WO 03/009683 | | 2/2003 | |
| WO | WO 2005006857 A2 | * | 1/2005 | A01M 25/00 |
| WO | WO 2006045122 A2 | * | 4/2006 | A01M 1/20 |

OTHER PUBLICATIONS

Notice to Manufacturers, Formulators Registrants and Users of Pesticides, United States Environmental Protection Agency, Washington D.C., Sep. 16, 1994.

Office Action, issued in U.S. Appl. No. 10/550,378, mailed Aug. 21, 2007.

Office Action, issued in U.S. Appl. No. 10/550,378, mailed Dec. 28, 2007.

Office Action, issued in U.S. Appl. No. 10/550,378, mailed Sep. 19, 2008.

Office Action, issued in U.S. Appl. No. 10/550,378, mailed Feb. 18, 2009.

Office Action, issued in U.S. Appl. No. 10/550,378, mailed Jul. 8, 2009.

Office Action, issued in U.S. Appl. No. 10/550,378, mailed Nov. 12, 2009.

Response to Office Action, issued in U.S. Appl. No. 10/550,378, dated Jun. 27, 2008.

Response to Office Action, issued in U.S. Appl. No. 10/550,378, dated Dec. 9, 2008.

Response to Office Action, issued in U.S. Appl. No. 10/550,378, dated May 13, 2009.

Response to Office Action, issued in U.S. Appl. No. 10/550,378, dated Aug. 26, 2009.

Supplemental Response to Office Action, issued in U.S. Appl. No. 10/550,378, dated May 13, 2009.

* cited by examiner

TAMPER-RESISTANT FLY CONTROL STATION AND METHODS FOR USING THE SAME

CROSS-REFERENCE TO RELATED APPLICATION

The present application claims priority to Provisional Patent Application Ser. No. 60/791,294, filed Apr. 11, 2006.

FIELD OF INVENTION

The present invention relates in general to pest control techniques, and in particular to a tamper-resistance fly control station and methods for using the same.

BACKGROUND OF INVENTION

The problem of controlling pests, particularly insects such as flies and mosquitoes, is very well known and has been extensively studied. Hence, numerous pest control techniques have been developed, some of which have been successful, and others which have not been successful. Even today, the search for successful new and improved pest control techniques continues.

Existing fly control techniques typically rely on fly lights and glue products disposed in areas where insects congregate. However, these techniques are not completely effective. Furthermore, while simply disposing fly bait around areas frequented by humans or animals is one option, given the usual toxicity of the given insect control product, this is not the best option. In sum, new pest control techniques are needed, which are not only more effective, but also which can safely be used around humans and animals.

SUMMARY OF INVENTION

The principles of the present invention are embodied in tamper-resistant fly control stations and methods for using the same. According to one exemplary embodiment, a control station is disclosed for holding insect bait that includes a body portion having sidewalls and a rear wall defining a receptacle having an opening. A door portion is rotatably coupled to the body portion for covering the opening defined by the body portion in a closed configuration of the station. A tamper resistant latching mechanism is disposed within the receptacle in the closed configuration of the station, and is accessible by a key through an aperture through the door portion.

Embodiments of the present invention advantageously allow for the use of potentially toxic pest baits with minimized risk of unauthorized or undesirable contact by humans and animals. Consequently, pest control programs may be established in locations frequented by humans and animals, where previously control was not possible or not allowed due to the toxicity of the baits. (Notwithstanding, application of the principles of the present invention are still subject to the use restrictions and warnings set forth by the manufacturer on the labels accompany the given insect bait or insecticide).

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1:
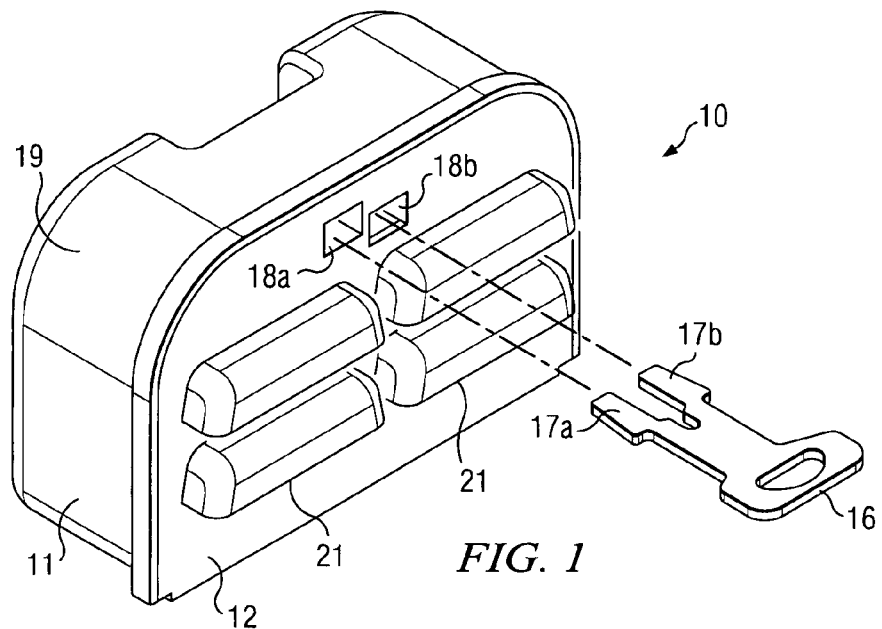
FIG. 1 is a perspective diagram of a representative tamper-resistant fly station, in the closed configuration, according to the principles of the present invention.
Figure 2:
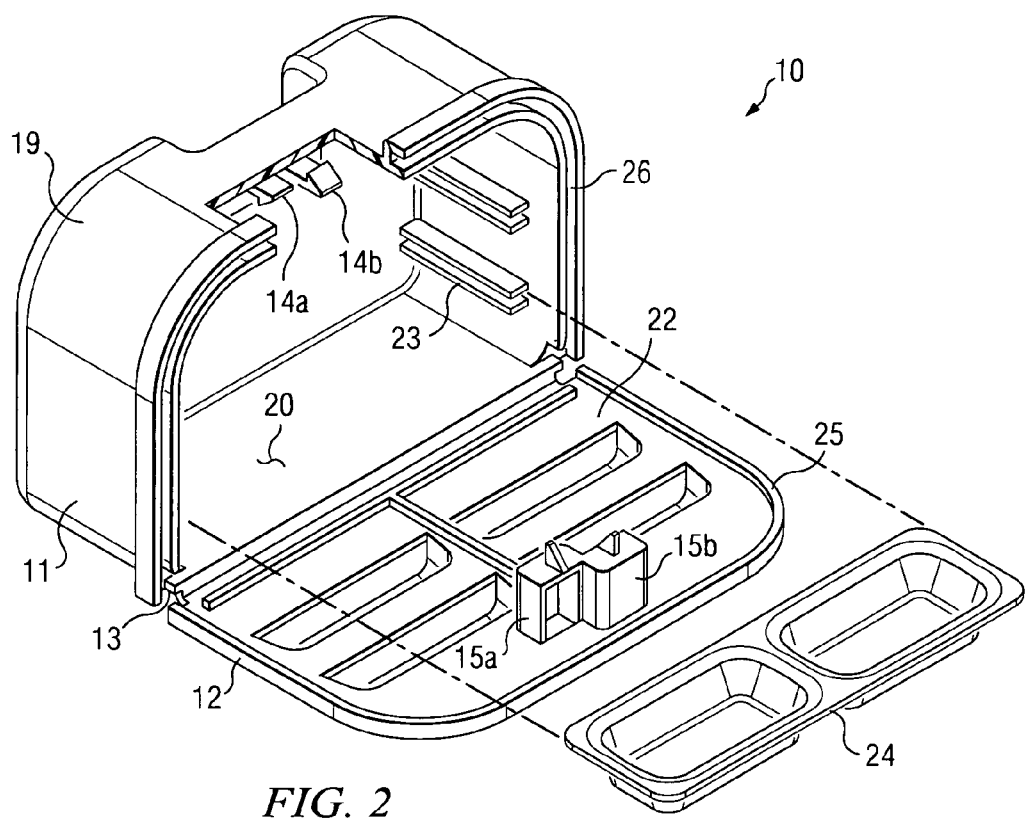
FIG. 2 is a perspective diagram of the representative tamper-resistant fly station of FIG. 1, in the open (unlocked) configuration.

FIGS. 1 and 2 show a tamper-resistant fly station 10 embodying the principles of the present invention. Tamper-resistant fly station 10 includes a main body portion 11 adapted to receive a tray of insect bait and a door portion 12. According to the principles of the present invention, door portion 12 pivots around a hinge 13 to provide a cover over the aperture of main body portion 11 when fly station 10 is in use. In particular, a pair of tamper resistant latches 14a and 14b on main body portion 11 snap onto the sidewalls of corresponding receptacles 15a and 15b on door portion 12. In one preferred embodiment of the present inventive principles, the tamper resistant latch/locking mechanism utilizes a flat key 16 to prevent unintended or unauthorized entry into tamper-resistant fly station 100. As discussed further below, flat key 16 includes a pair of extensions or prongs 17a and 17b that access the tamper resistant latch/locking mechanism through key apertures 18a and 18b through door portion 12.

The sides 19 of main body portion 11 are preferably sloped to allow for water, snow, or particulate matter to drain off. The backwall of main body portion 11 also includes a series of small holes or vents (not shown), which allow air flow into the interior of fly station 10, as well as a series of apertures (not shown), which allow fly station 10 to be mounted on a wall, post, or similar surface with screws, zip ties, or similar attachment apparatus. The bottom inner surface of 20 of main body portion 11 provides an area for receiving bait glue boards, insecticides, or other pest control products. These pest control products may be, depending on the application, in granular, powdered, liquid, or solid form.

Door portion 12 of tamper-resistant fly station 10 includes a set of louvered vents 21, which allow insects to gain entry into the interior of fly station 10, but keep out children's hands and pets. The inner surface of door portion 12 also includes a name plate area 22.

Main body portion 11 includes an internal set of racks or slots 23 for receiving a corresponding bait tray 24. Bait trays 24 hold insect bait or poison, such as fly or mosquito bait. Advantageously, bait trays 24 are easy to clean or replace.

Tamper-resistant fly station 10 can be made of any one of a number of materials, including plastics, metals, and composites. In the preferred embodiment, tamper-resistant fly station 10 is made out of clear plastic that has been embedded with metallic flake. Advantageously, the embedded metallic flake reflects light, particularly UV light, which creates contrast that helps to attract insects.

Tamper-resistant fly station 10 is particularly useful for fly control programs, such as that described below. However, tamper-resistant fly station 10 can also be used to bait any one of a number of other insects and pests. Advantageously, tamper-resistant fly station 10 prevents water from reaching the poison, keeps wind from transmitting the bait, and advantageously keeps children and pets away from the poison.

Figure 3A:
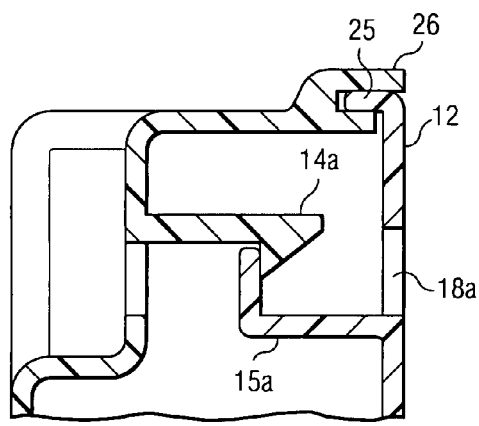
FIGS. 3A and 3B are small cross-sectional diagrams illustrating the tamper-resistant latching/locking mechanism of the representative tamper-resistant fly station in latched and unlatched configurations, respectively.
Figure 4A:
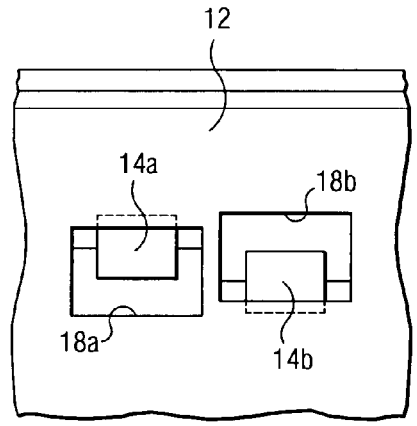
FIGS. 4A and 4B are more detailed diagrams of the tamper-resistant latching/locking mechanism, in the latched and unlatched configuration, respectively, as viewed through the key apertures of FIG. 1.

FIG. 3A is a partial side view illustrating the tamper resistant latch/locking mechanism in the locked configuration, according to the principles of the present invention. As shown in FIG. 3A, latch 14a has engaged receptacle 15a when door portion 12 has been pushed into engagement with main body portion 11 of fly station 10. In particular, latch 14a is engaged in a downward direction to capture the upward-projecting sidewall of receptacle 15a, as further viewed through aperture 18a in FIG. 4A. At the same time, latch 14b is engaged in an upward direction with downward-projecting sidewall of receptacle 15b, as seen through aperture 18b in FIG. 4A. Edge sidewall 25 of door portion 12 fits snuggly within receptacle 26 around the perimeter of main body portion 11 provide protection against the incursion of water, dirt, or the like, as well as protect against unwanted entry of humans or animals.

Figure 3B:
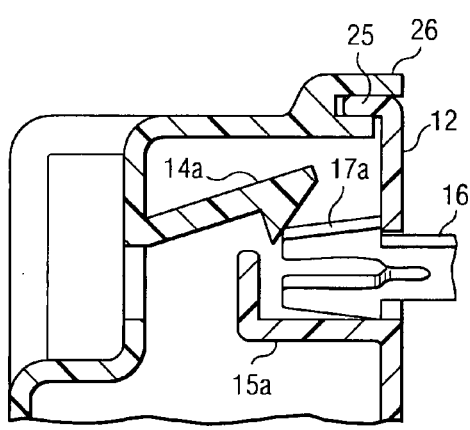
Figure 4B:
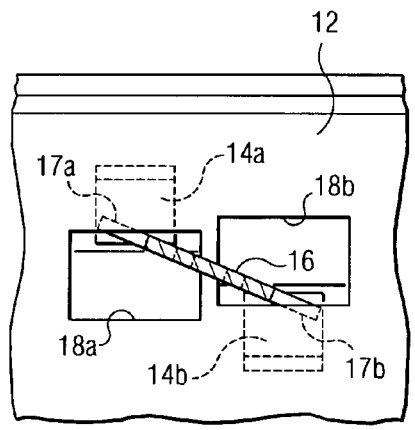

FIGS. 3B and 4B illustrate the unlocking of the tamper resistant latch/locking mechanism according to the principles in the present invention. Specifically, prongs 17a and 17b have been inserted into apertures 18a and 18b, and rotated clockwise, as shown in FIG. 4B. Consequently, as shown in FIG. 3B, prong 17a of key 16 forces latch 14a upwards, such that it disengages from upward-projecting sidewall of receptacle 15a. At the same time, prong 17b of key 16 forces latch 14b downward, as shown in FIG. 4B, such that latch 14b similarly disengages from the downward-projecting sidewall of receptacle 15b. With the tamper resistant latch/locking mechanism so disengaged, door portion 12 can be manually pulled away from main body portion 11 to open fly station 10.

Advantageously, the tamper resistant latch/locking mechanism ensures that tamper-resistant fly station 10 can be used safely and efficiently, even in areas where children and pets may be found.

Tamper resistant fly station 10 can advantageously be placed around trash and garbage areas near single family homes and multi-family housing facilities, as well as areas where pets are kept (e.g. dog kennels, dog houses, and dog runs). Furthermore, embodiments of fly station 100 may be advantageously utilized around the dumpster and garbage areas surrounding commercial facilities including restaurants, hospitals, hotels, or retail facilities. Fly station 10 may also be used in agricultural facilities including horse barns, chicken facilities, feed lots, slaughter houses, and the like. In sum, Fly Station 10 can be used anywhere where humans, good and services may be harmed, damaged, contaminated or annoyed by flies and other flying insects.

According to the principles of the present invention, if a large facility requires insect control, a line of methodically placed fly stations 10 would be disposed around the perimeter of the facility in rocks, trees, bushes, cacti, and similar locations. If a fence line exists, a line of fly stations 10 may be directly fastened to the fence. Similarly, fly station 10 can be attached to walls close to doors, dumpsters, windows and other entry points for insects. Finally, if State and Federal laws allow inside fly control or the use of properly protected pest control chemicals, fly station 10 may even be used inside of a home or commercial facility.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. An insect control station comprising:
   a body for holding an insect control product and including sidewalls and a backwall defining a receptacle, the body having a width when mounted to a wall and a height when mounted to the wall, where the width is greater than the height, the body having a female edge;
   a door for covering the receptacle in a closed configuration of the insect control station, the door including at least one louvered aperture, the at least one louvered aperture comprising an aperture that communicates with the receptacle when the insect control station is in the closed configuration and a louver that projects outwardly from the door and away from the body, the door also having a male edge sized to fit within the female edge of the body when in the closed configuration of the insect control station; and
   a locking mechanism for providing tamper resistant closure of the door and the body, the locking mechanism accessible for actuation by a key from outside the insect control station in the closed configuration.

2. The insect control station of claim 1, wherein the locking mechanism comprises:
   at least one flexible latch disposed on a selected one of the body and the door; and
   at least one tab for mating with the at least one flexible latch and disposed on another one of the body and the door.

3. The insect control station of claim 1, wherein the locking mechanism is accessible by the key through at least one aperture through the door.

4. The insect control station of claim 1, wherein the locking mechanism comprises:
   a first latch disposed on the body and having a first notch facing in a first direction and a corresponding first tab disposed on the door facing in a second direction and adapted to mate with the first notch of the first latch, the first latch adapted to flexibly engage and disengage with the first tab.

5. The insect control system of claim 4, further comprising:
   a second latch disposed on the body and having a second notch facing in the second direction and a second tab disposed on the door facing in the first direction and adapted to mate with the second notch of the second latch, the second latch adapted to flexibly engage and disengage with the second tab.

6. The insect control station of claim 5, further comprising:
   a key that comprises first and second prongs for rotation against the first latch and the second latch for flexible disengagement from the first tab and the second tab.

7. The insect control station of claim 6, wherein the key is substantially flat.

8. The insect control station of claim 1, further comprising: at least one set of racks for receiving a tray within the receptacle; and a tray for sliding insertion into the at least one set of racks.

9. A station for holding an insect control product comprising:
   a body portion having sidewalls and a rear wall defining a receptacle having an opening, the body portion having a width when mounted to a wall and a height when mounted to the wall, where the width is greater than the height, the body portion also having a female edge;
   a door portion rotatably coupled to the body portion for covering the opening defined by the body portion in a closed configuration of the station, the door portion having an exterior face and including at least one louvered aperture, the at least one louvered aperture comprising an aperture in the exterior face that communicates with the receptacle when the station is in the closed configuration and a louver that projects outwardly from the exterior face of the door portion and away from the body portion, the door portion also having a male edge sized to fit within the female edge of the body portion when in the closed configuration of the station; and
   a tamper resistant latching mechanism disposed within the receptacle in the closed configuration of the station, the tamper resistant latching mechanism accessible by a key through at least one key aperture through the door portion.

10. The station of claim 9, wherein the tamper resistant latching mechanism comprises:
    a tab disposed on the door portion; and
    a latch disposed on the body portion and adapted to latch with the tab in the closed configuration of the station.

11. The station of claim 10, wherein the latch is adapted to be unlatched from the sidewall of the receptacle by flexing force applied by the key.

12. The station of claim 10, wherein the tab and the latch comprise one of a pair of corresponding tabs and latches.

13. The station of claim 9, wherein the body portion includes at least one set of racks for receiving a tray for holding an insect control product.

14. The station of claim 1, wherein the female edge comprises a slot disposed around at least a portion of a periphery of the receptacle and the male edge comprises a projection adapted to mate with the slot in the closed configuration of the station.

15. The station of claim 9, wherein at least one of the body portion and the door portion is formed of plastic.

16. A tamper resistant pest control station comprising:
    a body having sidewalls and a backwall defining a receptacle, the body having a width when mounted to a wall and a height when mounted to the wall, where the width is greater than the height, the body having a female edge;
    a door for covering the receptacle in a closed configuration of the station, the door including at least one louvered aperture and at least one key aperture, the door also having a male edge sized to fit within the female edge of the body when in the closed configuration of the station;
    a locking mechanism for providing tamper resistant closure of the door and the body, the locking mechanism accessible through the at least one key aperture for actuation by a key from outside the station in the closed configuration and including:
      a first latch disposed on the body and having a first notch facing in a first direction and a first tab disposed on the door facing in a second direction and adapted to mate with the first notch of the first latch, the first latch adapted to flexibly engage and disengage with the first tab; and
      a second latch disposed on the body and having a second notch facing in the second direction and a second tab disposed on the door facing in the first direction and adapted to mate with the second notch of the second latch, the second latch adapted to flexibly engage and disengage with the second tab;
    a removable tray within the receptacle for holding a pest control product, the removable tray having an open top, a depth, a length, and a width, the depth being less than the length and the length being greater than the width; and
    the sidewalls of the body having at least two racks, each configured to receive an edge of the removable tray.

\* \* \* \* \*

UNITED STATES PATENT AND TRADEMARK OFFICE
CERTIFICATE OF CORRECTION

| | | |
|---|---|---|
| PATENT NO. | : 8,720,107 B1 | Page 1 of 1 |
| APPLICATION NO. | : 11/786355 | |
| DATED | : May 13, 2014 | |
| INVENTOR(S) | : Vickery | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this
Eleventh Day of August, 2015

Michelle K. Lee
*Director of the United States Patent and Trademark Office*